May 6, 1941.    R. G. LE TOURNEAU    2,240,564
TRAILER
Filed July 9, 1940    2 Sheets-Sheet 1
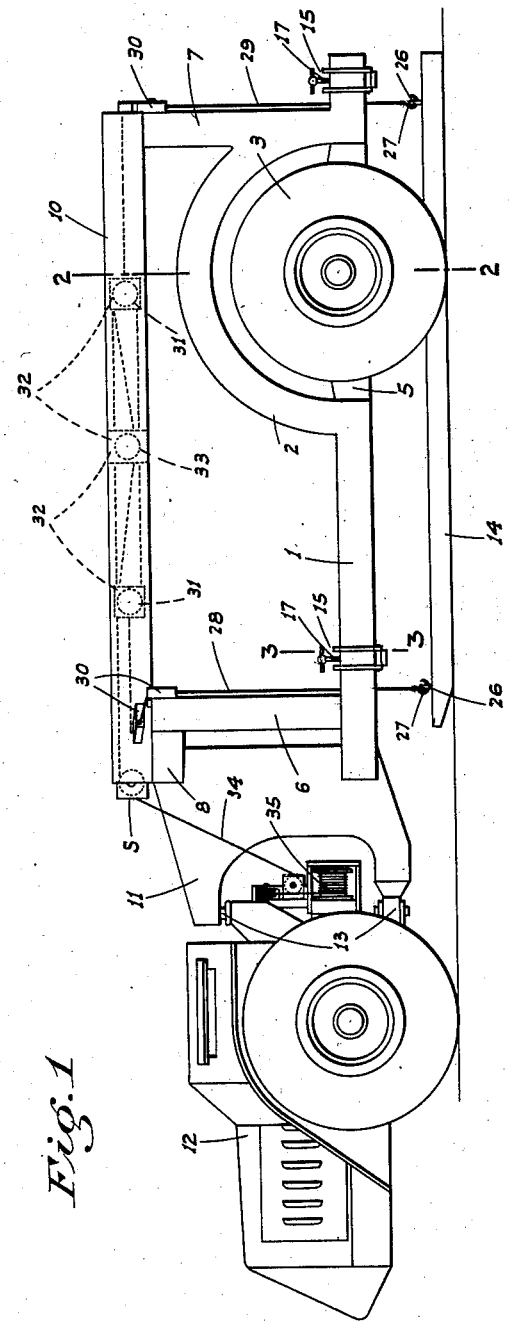
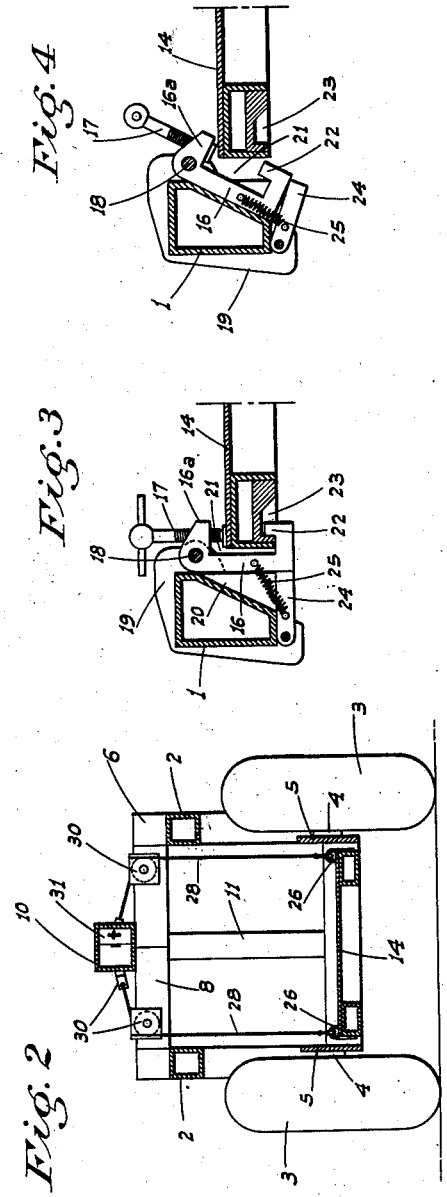
INVENTOR
R. G. LeTourneau
BY
Webster & Webster
ATTORNEYS May 6, 1941.   R. G. LE TOURNEAU   2,240,564
TRAILER
Filed July 9, 1940   2 Sheets-Sheet 2

INVENTOR
R.G.LeTourneau
BY
ATTORNEYS

Patented May 6, 1941

2,240,564

UNITED STATES PATENT OFFICE 2,240,564

TRAILER

Robert G. Le Tourneau, Peoria, Ill., assignor to R. G. Le Tourneau, Inc., a corporation of California Application July 9, 1940, Serial No. 344,525

7 Claims. (Cl. 254—4)

This invention relates particularly to trailers, and it is my principal object to provide in a trailer, a separate bed supported in releasable connection with the frame of the trailer whereby said bed may be released from the frame, lowered to the ground, and detached from the lowering means for loading.

Another object of the invention is to provide unique means to releasably latch said separate bed, when in carrying position, in connection with the trailer frame whereby to prevent accidental separation of the bed from said frame during movement of the unit.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation showing the trailer arranged in semi-trailer relation with a tractor, and with the bed lowered to ground level but before being detached from the cables.

Figure 2 is a cross section taken on line 2—2 of Fig. 1.

Figure 3 is a cross section taken on line 3—3 of Fig. 1, showing one of the bed supporting and latching assemblies in operative position.

Figure 4 is a similar view but illustrating the bed supporting and latching assembly in position to permit lowering of the bed.

Figure 5:
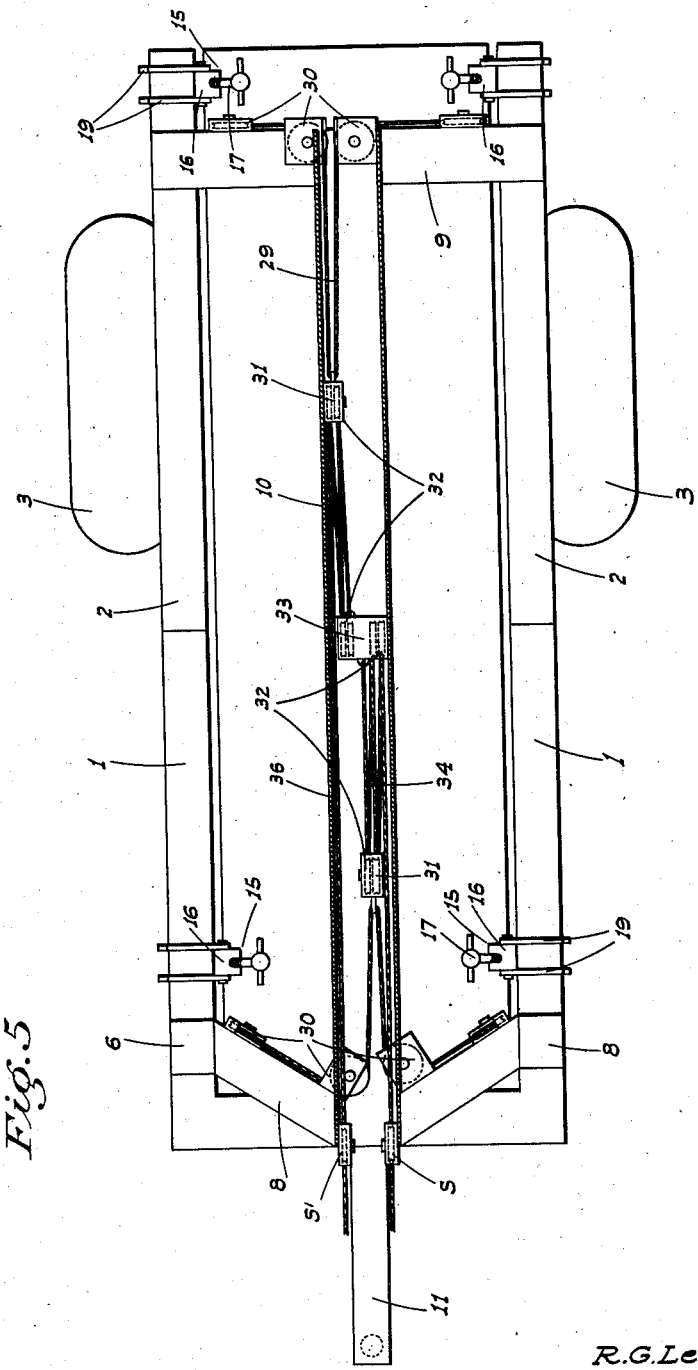
Figure 5 is a top plan view of the trailer.

Referring now more particularly to the characters of reference on the drawings, the semi-trailer frame comprises separate laterally spaced, longitudinally extending frame members 1 disposed horizontally some distance above the ground; such frame members adjacent their rear ends being arched as at 2 over wheels 3 which support the rear end of the semi-trailer. The spindles 4 for such wheels are fixed on and project laterally outward from plates 5 which bridge the arched portions 2 at the lower ends thereof.

Vertical corner posts are mounted on the frames 1 adjacent their ends, the forward corner posts being indicated at 6 and the rear corner posts being indicated at 7. A cross member 8 extends horizontally between the upper ends of the forward corner posts 6, while another cross member 9 extends horizontally between rear corner posts 7. A central longitudinal frame member 10 of hollow construction is supported horizontally by cross members 8 and 9. By reason of the above described structure it will be seen that the frame of the semi-trailer is of substantial height, open at its rear end and of hollow or skeleton-like arrangement. At its forward end the frame of the semi-trailer is provided with a fixed forwardly projecting vertical yoke 11, such yoke being swivelly connected with the rear end of a two-wheel type tractor, indicated generally at 12; the connections, indicated generally at 13, between the yoke 11 and tractor 12, being substantially the same as shown in my copending application for United States Letters Patent Serial No. 354,001, filed Aug. 24, 1940.

The bed of the semi-trailer, indicated generally at 14, is separate from the semi-trailer frame but is normally maintained or supported in horizontal position between side frames 1 by means of a plurality of latching assemblies, indicated generally at 15, mounted on side frames 1 adjacent the ends thereof and cooperatively engaging the sides of bed 14 in the manner as will hereinafter appear.

Each such latching and supporting assembly comprises a vertically disposed, inwardly facing C-clamp 16 arranged with the hand screw 17 extending upwardly; such C-clamp being pivoted adjacent its upper end as at 18 between a pair of vertical longitudinally spaced plates 19 fixed on the corresponding side frame 1. The side frame is beveled or cut away adjacent the back of the C-clamp, as at 20, to permit the C-clamp to swing laterally outward relative to pivot 18 whereby the lower portion of such C-clamp will clear the adjacent portion of the bed 14 permitting the same to lower, all as clearly shown in Fig. 4.

The sides of the bed 14 normally engage in the throat 21 of the C-clamps, the lower and upturned lip 22 of the clamps projecting into downwardly opening sockets 23 in the bottom of the bed; the hand screws 17 being run down against the upper surface of the bed as clearly shown in Fig. 3. The bed is thus normally supported in carrying position and latched against accidental escape from the latching and supporting assemblies 15. In order to further assure against the latching assemblies accidentally freeing themselves from the bed, I provide each assembly with a locking finger 24 pivoted at one end between plates 19 below the corresponding frame 1; there being a tension spring 25 connected between locking finger 24 and C-clamp 16 in a manner to urge such locking finger into abutment with the back edge of the C-clamp adjacent its lower end. Thus, as each C-clamp is brought into latching and supporting engagement with the bed 14, the corresponding locking finger 24 automatically snaps into place and the corresponding C-clamp thereafter cannot swing laterally outward about its pivot 18, in a direction to release the bed, until locking finger 24 is manually lowered and rides the bottom of the C-clamp as shown in Fig. 4.

In order to raise and lower the bed to and from a carrying position, I provide the following arrangement:

Adjacent the corners and on top the bed is provided with eyes 26 for the reception of hooks 27 on one end of a forward pair of cables 28, and rear pair of cables 29. Said cables extending upwardly about suitably mounted direction changing sheaves 30 into the hollow longitudinal frame member 10 adjacent its ends. Each pair of cables is connected at the other end with the free block 31 of a block and tackle unit indicated generally at 32; such block and tackle units extending in member 10 in opposite direction from the fixed sheave block 33 which is common to both units and which is supported in the frame member 10. The actuating cable 34 for one block and tackle unit 32 leads thereto over suitable fair lead sheaves S from one drum of a two-drum power control unit mounted on the back of the tractor and indicated generally at 35. The cable 36 for the other block and tackle unit 32 likewise leads over fair lead sheaves S1 from the other drum of the power control unit 35. By actuating said cables simultaneously and with equal movement, the corresponding block and tackle units 32 are either lengthened or shortened equally, effecting movment of cables 28 and 29 and raising or lowering of bed 14. However, cables 34 and 36 may be operated independently if it is desired to dispose the bed on a slant.

When the bed 14 has been released from assemblies 15 and lowered to the ground, the hooks 27 may be released from eyes 26 and the tractor and semi-trailer unit proceed elsewhere during the loading of the bed. After the bed is loaded, the semi-trailer is backed over such loaded bed, the hooks reconnected with the eyes and the bed then raised to a carrying position by proper manipulation of the power control unit.

As the bed approaches carrying position, the top thereof engages the upper overhanging portion 16a of C-clamps 16, which have previously been swung laterally outward to permit lowering of the bed. As the bed engages such portions 16a, it automatically swings the C-clamps into latching position and locking fingers 24 snap into engagement with the back of the C-clamps adjacent their lower end. Thereafter it is only necessary to lower the bed slightly to effect engagement of lips 22 in sockets 23, and when this has been accomplished, hand screws 17 are run down into engagement with the upper surface of the bed.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a vehicle, a frame having spaced side members disposed above the ground, a separate load supporting bed normally disposed between said members in carrying position, and a plurality of supporting assemblies mounted on said side members in spaced relation and releasably cooperating with the bed, each such assembly comprising a vertically disposed, inwardly opening C-clamp, the adjacent portion of the bed engaging in the throat of said C-clamp.

2. In a vehicle, a frame having spaced side members disposed above the ground, a separate load supporting bed normally disposed between said members in carrying position, and a plurality of supporting assemblies mounted on said side members in spaced relation and releasably cooperating with the bed, each such assembly comprising a vertically disposed, inwardly facing C-clamp, and means pivoting the clamp adjacent its upper end for outward lateral swinging movement, the adjacent portion of the bed normally being engaged and clamped in the throat of the clamp.

3. In a vehicle, a frame having spaced side members disposed above the ground, a separate load supporting bed normally disposed between said members in carrying position, and a plurality of supporting assemblies mounted on said side members in spaced relation and releasably cooperating with the bed, each such assembly comprising a vertically disposed, inwardly facing C-clamp, and means pivoting the clamp adjacent its upper end for outward lateral swinging movement, the adjacent portion of the bed normally being engaged and clamped in the throat of the clamp, and a spring actuated locking finger pivoted adjacent the clamp and arranged to releasably engage the clamp and prevent pivotal movement thereof.

4. In a vehicle, a frame having spaced side members disposed above the ground, a separate load supporting bed normally disposed between said members in carrying position, and a plurality of supporting assemblies mounted on said side members in spaced relation and releasably cooperating with the bed, each such assembly comprising a vertically disposed, inwardly opening C-clamp, the adjacent portion of the bed engaging in the throat of said C-clamp; said clamp having a lower upturned lip, and the bottom of the bed having a downwardly opening socket into which said lip engages.

5. In a tractor and semi-trailer unit, a semi-trailer having an open bottom frame, a separate load supporting bed normally disposed in carrying position relative to the frame, means releasably supporting the bed from the frame, the frame extending above the normal carrying position of the bed, supporting cables depending from the frame above the bed and connecting with the latter, and other means associated with said cables and operative from the tractor to raise or lower the cables.

6. In a tractor and semi-trailer unit, a semi-trailer having an open bottom frame, a separate load supporting bed normally disposed in carrying position relative to the frame, means releasably supporting the bed from the frame, the frame extending above the normal carrying position of the bed, supporting cables depending from the frame above the bed and connecting with the latter, and other means to raise or lower said cables, the tractor having a power control unit with which said other means are associated.

7. In a vehicle, a frame disposed above ground level, a load supporting bed movable vertically between the frame and the ground, means to lower and raise the bed, and other means mounted on the frame to support the bed in a raised position and functioning automatically with the raising of the bed to a predetermined position relative to the frame.

ROBERT G. LE TOURNEAU.